(No Model.)
R. B. LESTER.
WATCH MOVEMENT BOX.
No. 318,124. Patented May 19, 1885.
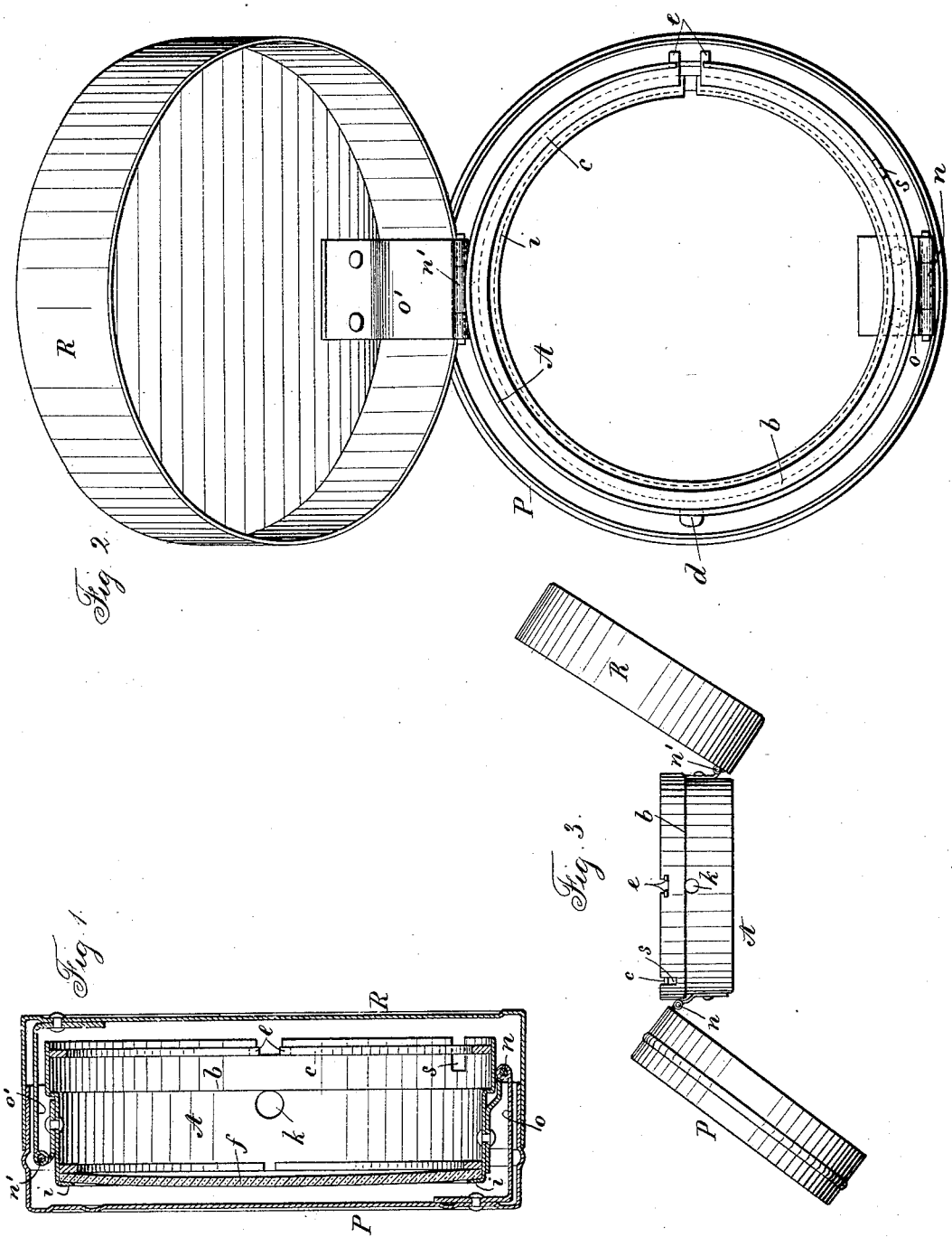

UNITED STATES PATENT OFFICE.

ROBERT B. LESTER, OF BROOKLYN, NEW YORK.

WATCH-MOVEMENT BOX.

SPECIFICATION forming part of Letters Patent No. 318,124, dated May 19, 1885.

Application filed February 9, 1885. (No model.)

*To all whom it may concern:*

Be it known that I, ROBERT B. LESTER, of Brooklyn, in the county of Kings and State of New York, have invented an Improvement in Boxes for Watch-Movements, of which the following is a specification.

Boxes for watch-movements are usually made of tin of a size to receive the movement, and then the tin box and movement are wrapped in paper and placed in a larger tin box with a cover. In other instances there is a holder fastened within the bottom of the tin box, and into this the movement is placed and secured by spring-clips. In both these boxes difficulty arises in showing the works, because the face only is visible without lifting the movement out of the box or holder, and in cases where traveling salesmen exhibit watch-movements they are liable to be returned into the wrong tin boxes, and this confusion is produced because the marks indicating grade of watch are usually upon the outside of these tin boxes.

The object of my improvement is to allow for full exhibition of all parts of the movement, and for winding and setting the same without separating the movement from the sheet-metal box, and for protecting the movement from dust and from injury by concussion upon the box. I accomplish these objects by the use of a secondary box within the sheet-metal box and hinges by which the secondary box is connected to the outer box, so that the secondary box can be swung into or out of the main box, and thereby expose either the movement or the face to inspection.

In the drawings, Figure 1 is a section of the box complete in an enlarged size. Fig. 2 is a similar enlarged view of the box with one side open; and Fig. 3 is an edge view in about the ordinary size of the external box, with the secondary box between the two parts in the positions they can assume when swung open.

The secondary box A is in the form of a ring with an offset or seating at $b$, upon which the edge of the dial-plate rests, as in an ordinary watch-case; but the rim of this secondary box extends sufficiently above the dial for the reception of an open spring-ring, $c$, which is expansive, and provided with catches $d$ $e$ at opposite sides passing into mortices or notches in the rim, so as to hold the watch-movement into this secondary box when placed therein. This secondary box is sufficiently deep for the reception of a glass, $f$, and an expansive ring by which it is held in place, there being an inward flange, $i$, upon which the the glass rests, which flange serves to stiffen and strengthen the secondary box. There is an opening at $k$ for the insertion of a key or winding square for winding the mainspring in stem-winding movements, and a notch, $s$, for the shipper or set that is acted upon when the hands of the movement are to be set. It will now be seen that this secondary box is adapted to receive and hold the movement securely, and the face can be inspected at one side and the works at the other side, and when a glass or watch crystal is introduced the atmosphere is excluded from the works. I provide a sheel-metal box with the two parts P and R with flanges, one passing within the other, as in the ordinary tin box for holding watch-movements; and at $o$ is a standard attached at its base within the box-bottom P, and at its upper end by a hinge, $n$, to one side of the secondary box A. If this hinge $n$ and standard $o$ alone are used, the secondary box can be swung into or out of the bottom P of the box, and the movement can be inspected without being separated from the box P. I, however, prefer a second standard, $o'$, and hinge $n'$ at the opposite side of the secondary box A to the hinge $n$, said standard $o'$ being fastened into the lid R of the main box. The parts can be swung out, as shown in Fig. 3, and all three of the parts of the box will be kept together, and the movement displayed without the risk of injury to the movement and without the necessity of removing catches or lifting out the movement, as in the boxes heretofore used.

I claim as my invention—

1. The secondary box A, having a seating, $b$, for the watch-movement, and a rim extending above the dial, in combination with a ring for holding the movement in place, substantially as set forth.

2. The secondary box A, adapted to receive and hold a watch-movement, in combination with the external box and a hinge to connect the secondary box to the external box, substantially as set forth.

3. The combination, with the external box, P R, of the secondary box A, to hold a watch-movement, the standards o o', and hinges n n', by means of which the secondary box is connected to the outer box and the parts capable of being opened, substantially as set forth.

4. In a box for holding watch-movements, a bottom and cover, in combination with an intermediate secondary box for the movements, standards connected by hinges to the secondary box and to the bottom and cover, respectively, a movable ring to hold the movement into the secondary box, and a glass in the lower part of the secondary box, substantially as set forth.

Signed by me this 6th day of February, A.D. 1885.

ROBERT B. LESTER.

Witnesses:
GEO. T. PINCKNEY,
WILLIAM G. MOTT.